United States Patent [19]

Fujioka et al.

[11] Patent Number: 5,300,611
[45] Date of Patent: Apr. 5, 1994

[54] ROOM TEMPERATURE CURABLE ORGANOPOLYSILOXANE COMPOSITIONS

[75] Inventors: Kazutoshi Fujioka, Annaka; Tokuo Satou, Usui; Masatoshi Arai, Annaka, all of Japan

[73] Assignee: Shin-Etsu Chemical Co., Ltd., Tokyo, Japan

[21] Appl. No.: 963,471

[22] Filed: Oct. 21, 1992

[30] Foreign Application Priority Data

Oct. 21, 1991 [JP] Japan .................................. 3-302290

[51] Int. Cl.$^5$ .............................................. C08G 77/06
[52] U.S. Cl. ......................................... 528/15; 528/17; 528/18; 528/21; 528/34; 528/38; 528/901
[58] Field of Search ..................... 528/38, 34, 901, 15, 528/17, 18, 21

[56] References Cited

U.S. PATENT DOCUMENTS

| | | | |
|---|---|---|---|
| 3,350,349 | 10/1967 | Hyde | 528/38 |
| 4,602,078 | 7/1986 | Joseph et al. | 528/38 |
| 4,797,446 | 1/1989 | Dietlein et al. | 528/34 |

*Primary Examiner*—Melvyn I. Marquis
*Attorney, Agent, or Firm*—Millen, White, Zelano & Branigan

[57] ABSTRACT

Room temperature curable organopolysiloxane compositions (and the hardened products of such compositions) which comprise (A) a diorganopolysiloxane with hydroxyl groups at both ends, (B) a quaternary functional silane with four groups to be hydrolyzed and/or partially hydrolyzed products thereof, (C) a curing catalyst, (D) a filler, (E) a tertiary functional silane with three groups to be hydrolyzed and/or partially hydrolyzed products thereof and (F) an amine functional silane and/or an addition products with an acrylic acid ester or with a methacrylic acid ester show good adhesiveness towards surface-activated objects which has superior water-resistance.

20 Claims, No Drawings

ROOM TEMPERATURE CURABLE ORGANOPOLYSILOXANE COMPOSITIONS

BACKGROUND OF THE INVENTION

1. Field of the Invention

This invention relates to room temperature curable organopolysiloxane compositions which possess superior water-resistant adhesiveness towards the surface-activated objects to be adhered.

2. Prior Art

Conventionally, room temperature curable organopolysiloxane compositions which contain quaternary functional silanes as a crosslinking agent have been known to harden rapidly to some depth. Further, compositions having amine functional silanes, in order to exhibit self-adhesiveness, have been utilized as adhesives and as sealants.

However, said compositions with good in-depth curing properties possess the disadvantage of inferior water resistance when room temperature curable organopolysiloxane rubber is used to bond objects which exhibit poor water-resistant adhesiveness due to their activated surface, such as float glass and aluminum. Therefore, these compositions could not be utilized for those cases which require a high degree of adhesion reliability, such as a structural sealant or as a sealant for the secondary seal in insulated glass.

One method to bond the surface-activated objects with room temperature curable organopolysiloxane rubbers utilizes mechanical or chemical treatment of these objects themselves in order to improve the adhesion power. However, this method still leaves problems: The treatment of such objects takes a long time, and some objects are of types which cannot be treated.

It is an object of this invention to provide organopolysiloxane compositions of the room temperature curable type which easily bond surface-activated objects while maintaining superior water-resistant adhesiveness.

Upon further study of the specification and appended claims, further objects and advantages of this invention will become apparent to those skilled in the art.

SUMMARY OF THE INVENTION

The inventors of this invention discovered the following facts: The utilization of room temperature curable organopolysiloxane compositions which have quaternary functional alkoxy silanes and amine functional silanes as a crosslinking agent and as a adhesion promoter, respectively, results in a rapid bonding of the silicone rubber with surface-activated objects; however, the bonding between the adhered body surface and the silicone rubber tends to cleave in the presence of hot water. On the other hand, the application of compositions which have tertiary functional alkoxy silanes and amine functional silanes leads to additional difficulty in adhesion but to stronger bonding between the adhered body surface and the silicone rubber even under hot water. Further, the utilization of compositions comprising quaternary functional alkoxy silanes, tertiary functional alkoxy silanes, and amine functional silanes results in rapid adhesion towards the surface-activated object with stronger bonding between the adhered object surface and the silicone rubber, even in the presence of hot water. In other words, this invention offers room temperature curable organopolysiloxane compositions and the hardened products obtained by the curing of said compositions which comprise (A) a diorganopolysiloxane of the general chemical formula (1):

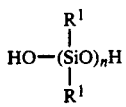

(1)

wherein $R^1$ is an unsubstituted or a substituted monovalent hydrocarbon group, each of which in the equation can be the same or different, and n designates an integer of at least 10, (B) a quaternary functional silane of the general chemical formula (2):

$$Si(OR^2)_4 \qquad (2)$$

wherein $R^2$ is an unsubstituted or a substituted monovalent hydrocarbon group, each of which in the equation can be the same or different, and/or their partially hydrolyzed products, (C) a curing catalyst, (D) a filler, (E) a tertiary functional silane of the general chemical formula (3):

$$R^3Si(OR^4)_3 \qquad (3)$$

wherein $R^3$ is an unsubstituted or a substituted monovalent hydrocarbon group with 1–8 carbon atoms, and $R^4$ is an unsubstituted or a substituted monovalent hydrocarbon group, each of which in the equation can be the same or different, and/or their partially hydrolyzed products, and (F) a silane with a functional amine group of the general chemical formula (4):

$$(R^5O)_3Si{-}R^6{-}NH{-}R^7 \qquad (4)$$

wherein $R^5$ is an unsubstituted or a substituted monovalent hydrocarbon group, each of which can be the same or different, $R^6$ is an unsubstituted or a substituted divalent organic group, and $R^7$ is either a hydrogen atom, an unsubstituted or a substituted monovalent hydrocarbon group, or an aminoalkyl group, and/or their addition products with acrylic acid esters or with methacrylic acid esters.

By "partially hydrolyzed" throughout is meant average hydrolyzation of at most 50 mole % of hydrolyzable groups such as $-OR^2$ or $-OR^4$ on each molecule.

DETAILED DESCRIPTION

(A) Diorganopolysiloxane

In the diorganopolysiloxane component (A) of this invention, both ends of its molecular chain are terminated by hydroxyl groups, and it is expressed by the general chemical formula (1):

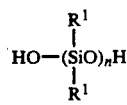

(1)

Within this formula (1), $R^1$ is a substituted or an unsubstituted monovalent hydrocarbon group, each of which in the formula can be the same or different and which usually has from 1–10 carbon atoms and more desirably from 1–8 carbon atoms. Examples are alkyl groups, such as a methyl group, ethyl group, propyl group, butyl group, and hexyl group; cycloalkyl groups, such as a cyclohexyl group; alkenyl groups, such as a vinyl group and an allyl group; aryl groups, such as a phenyl group and a tolyl group; aralkyl groups, such as a benzyl group and a phenylethyl group; and the above groups in which hydrogen atoms are partially substituted with halogen atoms, such as chloromethyl, trifluoropropyl, chloroethyl, chlorophenyl, chlorobenzyl, dichloroethyl, and trichloropropyl.

Since the viscosity of diorganopolysiloxane, the (A) component, is desirably in the range of 25-500,000 cSt at 25° C., or more preferably in the range of 1000-100,000 cSt, n in the formula (1) is an integer of at least 10, preferably 10-2000. Specific examples are:

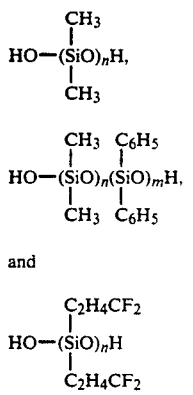

wherein n ranges from 100-2000, while m ranges from 10-200.

(B) Quaternary Functional Silanes

The quaternary functional silane, component (B), possesses four groups to be hydrolyzed and is of the general chemical formula (2):

$$Si(OR^2)_4 \qquad (2)$$

The quaternary functional silane can be partially hydrolyzed and condensed.

Within this formula (2), $R^2$ is a substituted or an unsubstituted monovalent hydrocarbon group, each of which in the formula can be the same or different and which usually has from 1-10 carbon atoms and more desirably from 1-8 carbon atoms. Examples are alkyl groups, such as a methyl group, ethyl group, propyl group, butyl group, and hexyl group; cycloalkyl groups, such as a cyclohexyl group; alkenyl groups, such as a vinyl group, allyl group, and propenyl group; aryl groups, such as a phenyl group and a tolyl group; aralkyl groups, such as a benzyl group and a phenylethyl group; and the above groups in which hydrogen atoms are partially substituted with halogen atoms, such as chloromethyl, trifluoropropyl, chloroethyl, chlorophenyl, chlorobenzyl, dichloroethyl, and trichloropropyl.

Specific examples for the component (B) of quaternary functional silanes are:

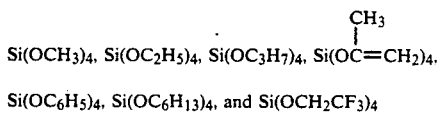

and their partially hydrolyzed products.

In addition, said quaternary functional silanes can be used individually or in combinations of two or more species in this invention.

The amount of component (B) relative to the number of hydroxyl groups in the diorganopolysiloxane component (A) is desirably a molar ratio of from 0.25-10, more desirably from 0.5-5. When the molar ratio of component (B) to the number of hydroxyl groups in diorganopolysiloxane is less than 0.25, the compositions will not easily be cured, while a molar ratio value exceeding 10 leads to a large compression set in the compositions of this invention during the curing process, which causes a lowering in product elasticity.

(C) Curing Catalysts

The component (C) of this invention is a curing catalyst which promotes the condensation reaction between hydroxyl groups in component (A) and groups to be hydrolyzed in component (B), both of which are a part of the compositions in this invention. Specific examples are metal salts of organic acids such as octanoic acid iron salt, naphthenic acid iron salt, octanoic acid cobalt salt, naphthenic acid cobalt salt, octanoic acid tin salt, naphthenic acid tin salt, octanoic acid lead salt, and naphthenic acid lead salt, alkyl tin ester compounds such as dibutyl tin diacetate, dibutyl tin dilaurate, and dibutyl tin dioctoate, halogenized tin compounds, tin orthoester compounds, metal alcoholates such as tetrabutyl titanate and tetrabutyl zirconate, titanium chelates such as diisopropoxy-bis-(acetylactonate) titanium, and diisopropoxy-bis-(ethylacetoacetate) titanium, and amines such as diethylhydroxyl amine, dimethylhydroxyl amine, and r-tetramethyl-guanidylpropyl trimethoxysilane. These are used individually or in combinations of two or more. Other conventional catalysts are well known to those of ordinary skill in the art.

The mixing ratio of component (C) is desirably from 0.01 to 10 parts by weight, most preferably 0.02 to 1 part by weight with respect to the 100 parts by weight of the component (A). Less than 0.01 parts of the component (C) lengthens the time to form a tuck-free coating after the exposure of the compositions in air, which hinders its curing to greater depths. Amounts of more than 10 parts by weight make the coat forming time to be on the order of several seconds, and such a short curing time hinders workability and causes a lowering in thermal resistance.

(D) Fillers

Suitable fillers for use in this invention, the component (D), include conventional types. Examples include metal oxides, such as silica fine powder, silica aerosol, precipitated silica, diatomaceous earth, iron oxide, zinc oxide, and titanium oxide; metal oxides whose surface is treated with silane; metal carbonates, such as calcium carbonate, magnesium carbonate, and zinc carbonate; asbestos; glass wool; carbon black; mica fine powder; molten silica powder; and powders of synthetic resins, such as polystyrene, polyvinyl chloride, and polypropylene, Other conventional fillers are well known to those of ordinary skill in the art.

The content of the component (D) with respect to 100 parts by weight of the component (A) is desirably in the range of from 1-400 parts by weight, more preferably from 10-300 parts by weight. Less than 1 part by weight of the component (C) causes a poor performance in some physical properties, such as hardness and tension strength, of the cured bodies obtained from the compositions of this invention. A content of more than 400 parts by weight increases the viscosity of the compositions in this invention and makes the working of this material difficult.

(E) Tertiary Functional Silanes

The tertiary functional silane, the component (E), possesses three groups to be hydrolyzed and is expressed by the general chemical formula (3):

$$R^3Si(OR^4)_3 \qquad (3).$$

The tertiary functional silanes can be partially hydrolyzed and condensed.

Within this formula (2), $R^3$ is a substituted or an unsubstituted monovalent hydrocarbon group, with the number of carbon atoms being from 1-8. Examples are alkyl groups such as a methyl group, ethyl group, propyl group, and butyl group, alkenyl groups such as a vinyl group and an allyl group, aryl groups such as a phenyl group and a tolyl group, and the above groups of which hydrogen atoms are partially substituted with halogen atoms, such as chloromethyl, trifluoropropyl, chloroethyl, chlorophenyl, chlorobenzyl, dichloroethyl, and trichloropropyl. $R^4$ is an unsubstituted or a substituted monovalent hydrocarbon group, each of which in the equation can be the same or different. For $R^4$, the same examples are applicable as listed for $R^2$ of the component (B).

Specific examples for the component (E) of tertiary functional silanes are:

$CH_3-Si-(OCH_3)_3$, $C_2H_5-Si-(OCH_3)_3$, $CH_2=CH-Si-(OCH_3)_3$, $C_6H_5-Si-(OCH_3)_3$, $C_6H_5-Si-(OC_2H_5)_3$, and $CH_2=CH-Si-(OC_3H_7)_3$ and their partially hydrolyzed products.

In addition, said tertiary functional silanes can be used individually, or in combinations of two or more species, in this invention.

The molar ratio of component (E) with respect to the number of hydroxyl groups in the diorganopolysiloxane component (A) is desirably from 0.33-10, more preferably from 0.7-5. When the molar groups in the diorganopolysiloxane is less than 0.33, the compositions of this invention show a poorer adhesiveness in water, while at a molar ratio of more than 10, their mechanical strength is lessened.

(F) Amine Functional Silanes

Amine functional silanes, the component (F), possess three groups to be hydrolyzed and one amino group. This component is assumed to function as an adhesion promoter in the compositions of this invention and is of the general chemical formula (4):

$$(R^5O)_3Si-R^6-NH-R^7 \qquad (4).$$

In the formula (4), $R^5$ is an unsubstituted or a substituted monovalent hydrocarbon group, each of which in the equation can be the same or different. For $R^5$, the same examples are applicable as listed for $R^2$ of the component (B). In the formula (4), $R^6$ is an unsubstituted or a substituted divalent organic group, preferably of 1-10 C atoms, for example, alkylene groups such as a methylene group, ethylene group, propylene group, tetramethylene group, hexamethylene group, and methylethylene group, arylene groups such as a phenylene group and a tolylene group, and alkylene arylene groups such as a methylene phenylene group and a ethylene phenylene group. In addition, $R^7$ in the same formula (4) is either a hydrogen atom, an unsubstituted or a substituted monovalent hydrocarbon group, preferably of 1-10 carbon atoms, such as alkyl groups including a methyl group, ethyl group, propyl group, and butyl group, or aminoalkyl groups such as an aminoethyl group and an N-aminoethyl group.

Specific examples for amino functional silanes, the component (F), are:

$(CH_3O)_3-Si-C_3H_6-NH_2$, $(C_2H_5O)_3-Si-C_3H_6-NH_2$, $(CH_3O)_3-Si-C_3H_6-NH-C_2H_4NH_2$, $(C_2H_5O)_3-Si-C_3H_6-NH-C_2H_4NH_2$, $(CH_3O)_3-Si-C_2H_4-\phantom{O}\text{C}_6\text{H}_4\phantom{O}-CH_2-NH_2$, and $(CH_3O)_3-Si-C_2H_4-\phantom{O}\text{C}_6\text{H}_4\phantom{O}-CH_2-NH-C_2H_4NH_2$.

Further, amino functional silanes of the component (F) can be addition products of the above with acrylic acid ester or with methacrylic acid ester, which are expressed by the general formula:

$$(R^5O)_3Si-R^6-\underset{\phantom{|}}{\overset{R^8}{\underset{|}{N}}}-(C_2H_4NH)_m-CH_2-\underset{\phantom{|}}{\overset{R^9}{\underset{|}{C}}}-\underset{\|}{\underset{O}{C}}-OR^{10},$$

wherein $R^5$ and $R^6$ are the same groups as described above, $R^8$ is either a hydrogen atom or an alkyl group, preferably of 1-10 carbon atoms; $R^9$ is either a hydrogen atom or a methyl group; $R^{10}$ is a similar group as $R^2$, that is, a monovalent hydrocarbon group, preferably of 1-10 carbon atoms, or the same in which hydrogen atoms are partially substituted with a $-Si(OR^5)_3$ group, and m designates 0, 1 or 2.

Specific examples for this compound are:

$(CH_3O)_3-Si-C_3H_6-NH-C_2H_4-NH-C_2H_4COOCH_3$, $(CH_3O)_3-Si-C_3H_6-NH-C_2H_4COOC_3H_6Si(OCH_3)_3$,

-continued

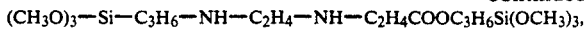

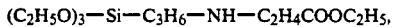

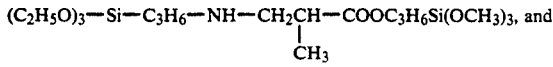

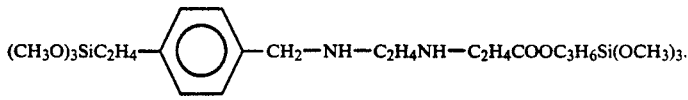

Further, these amino functional silanes are used individually, or in combinations of two or more.

The content of the component (F) with respect to 100 parts by weight of component (A) is desirably from 0.1 to 5 parts by weight, more preferably from 0.5 to 3 parts by weight. Less than 0.1 parts by weight of component (F) will not make a desirable adhesive and more than 5 parts by weight lowers the mechanical strength.

Room Temperature Curable Organopolysiloxane Compositions

Compositions of this invention are obtained as a one-component type, room temperature curable organopolysiloxane composition by uniformly mixing the appropriate amounts of the said components (A) through (F) in a dry atmosphere. When this composition is exposed to the air, humidity in the air promotes vulcanization to form an elastomer. Further, compositions may also be obtained as a two-component type room temperature curing composition which comprises a base polymer containing the components (A) and (D) and a curing agent containing the components (B), (C), (E), and (F). Mixing of this base polymer and the curing agent in air results in similar curing as seen in the one-component type. Further, the compositions of this invention can be combined with coloring agents, such as pigments and dyes; agents to improve heat resistance, such as iron oxide and cerium oxide; agents to improve resistance at low temperature; desiccants; rust preventers; and liquid reinforcers, such as crosslinking polysiloxanes which consist of triorganosiloxane units and $SiO_2$ units. Appropriate amounts of these additives are mixed in as necessary.

Applications

The room temperature curable organopolysiloxane compositions of this invention show a superior adhesiveness towards surface-activated objects while maintaining good water-resistant adhesiveness. Therefore, these compositions are now useful for applications such as structural sealants (SSG structural use silicone sealants) and as sealing and adhesive materials for glass and aluminum which are used as sealants for insulated glass secondary seals.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight. Viscosity measurements were carried out at 25° C.

The entire disclosures of all applications, patents, and publications, cited above and below, and of corresponding Japanese Application No. 3-302290, filed Oct. 21, 1991, are hereby incorporated by reference.

EXAMPLES

EXAMPLE 1

A base polymer was prepared by mixing 60 parts of calcium carbonate into 100 parts of dimethylpolysiloxane (viscosity: 50,000 cSt), in which both ends of its molecular chain are terminated with hydroxyl groups. A curing agent was prepared by mixing 4 parts of dimethylpolysiloxane (viscosity: 1,000 cSt), in which both ends of its molecular chain are terminated, with trimethylsilyl groups; 1.5 parts of tetra-n-propoxy silane; 1.5 parts of methyl-trimethoxy silane; 1.0 parts of aminopropyl triethoxy silane; and 0.1 parts of dibutyl tin dioctoate. Composition 1 was obtained by mixing the base polymer and the curing agent at a 10:1 ratio.

Using Composition 1 and float glass as an object to be bonded, H-type test bodies were constructed according to the procedure of JIS-A-5758. The sample Composition 1 was hardened at 20° C., with 55% RH for seven (7) days, then another seven (7) days at 50° C. One test body prepared as above was examined for adhesion strength under tensile shearing. The same tests were also performed for similar samples which were immersed into warm water at 80° C. for seven (7) and fourteen (14) days, respectively. The results are summarized in Table 1.

COMPARISON EXAMPLE 1

Composition 2 was obtained by a method similar to that described in Example 1, except that the 1.5 parts of methyl trimethoxy silane were not added to the curing agent; instead, the amount of tetra n-propoxy silane was increased to 3 parts.

The adhesion strength tests under tensile shearing were performed for the composition 2, similarly as in Example 1. The results are summarized in Table 1.

EXAMPLE 2

A base polymer was prepared by mixing 80 parts of calcium carbonate into 100 parts of dimethylpolysiloxane (viscosity: 20,000 cSt), in which both ends of its molecular chain are terminated with hydroxyl groups. A curing agent was prepared by mixing 4 parts of dimethylpolysiloxane (viscosity: 1,000 cSt), in which both ends of its molecular chain are terminated with trimethylsilyl groups, 1.0 parts of tetraethoxy silane, 2.0 parts of methyl-triethoxy silane, 1.0 parts of N-aminoethyl aminopropyl trimethoxy silane, and 0.1 parts of dibutyl tin dilaurate. Composition 3 was obtained by mixing the base polymer and the curing agent at a 10:1 ratio.

Adhesion strength tests under tensile shearing were performed for Composition 3, similarly as in Example 1. The results are summarized in Table 1.

COMPARISON EXAMPLE 2

Composition 4 was obtained by the similar method described in Example 2, except that the 1.0 part of tetraethoxy silane was not added to the curing agent; instead, the amount of methyl triethoxy silane was increased to 3 parts.

Adhesion strength tests under tensile shearing were performed for Composition 4, similarly as in Example 1. The results are summarized in Table 1.

EXAMPLE 3

A base polymer was prepared by mixing 100 parts of calcium carbonate into 100 parts of dimethylpolysiloxane (viscosity: 10,000 cSt), in which both ends of its molecular chain are closed with hydroxyl groups. A curing agent was prepared by mixing 4 parts of dimethylpolysiloxane (viscosity: 1,000 cSt), in which both ends of its molecular chain are closed with trimethylsilyl groups; 1.0 part of tetraethoxy silane; 2.0 parts of vinyl triethoxy silane; 1.0 part of a compound expressed by a general formula:

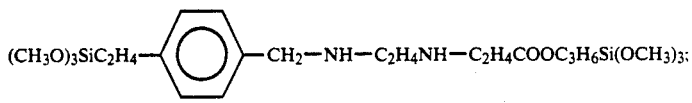

and 0.1 part of dibutyl tin dimethoxide. Composition 5 was obtained by mixing the base polymer and the curing agent at a 10:1 ratio.

Adhesion strength tests under tensile shearing were performed for Composition 5, similarly as in Example 1. The results are summarized in Table 1.

COMPARISON EXAMPLE 3

Composition 6 was obtained by a method similar to that described in Example 3, except that the 2.0 parts of vinyl triethoxy silane were not added to the hardening agent; instead, the amount of tetraethoxy silane was increased to 3 parts.

Adhesion strength tests under tensile shearing were performed for Composition 6, similarly as in Example 1. The results are summarized in Table 1.

TABLE 1

| | Composition No. | | | | | |
|---|---|---|---|---|---|---|
| | 1 | 2 | 3 | 4 | 5 | 6 |
| Beginning | | | | | | |
| Maximum Tension Strength (kgf/cm$^2$) | 10.4 | 10.0 | 12.0 | 6.6 | 15.0 | 15.5 |
| Cohesive Failure Ratio (%) | 100 | 100 | 100 | 60 | 100 | 100 |
| 80° C. × 7 days | | | | | | |
| Maximum Tension Strength (kgf/cm$^2$) | 10.9 | 8.8 | 11.4 | 8.5 | 14.5 | 10.2 |
| Cohesive Failure Ratio (%) | 100 | 80 | 100 | 80 | 100 | 80 |
| 80° C. × 14 days | | | | | | |
| Maximum Tension Strength (kgf/cm$^2$) | 10.5 | 2.0 | 11.5 | 8.8 | 14.0 | 3.0 |
| Cohesive Failure Ratio (%) | 100 | 0 | 100 | 70 | 100 | 0 |

Effects of Invention

Room temperature curable organopolysiloxane compositions of this invention possess a superior adhesiveness towards surface-activated objects, which adhesiveness has good water-resistance.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A room temperature curable organopolysiloxane composition comprising:

(A) a diorganopolysiloxane of formula (1):

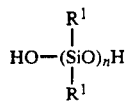

wherein each $R^1$ independently is an unsubstituted or a substituted monovalent hydrocarbon group, and n is an integer of at least 10, (B) a quaternary functional silane of formula (2):

wherein each $R^2$ independently is an unsubstituted or a substituted monovalent hydrocarbon group, or a partially hydrolyzed product of said silane;

(C) a curing catalyst;

(D) a filler;

(E) a tertiary functional silane of formula (3):

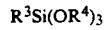

wherein $R^3$ is an unsubstituted or a substituted monovalent hydrocarbon group with from 1 to 8 carbon atoms, and each $R^4$, independently, is an unsubstituted or a substituted monovalent hydrocarbon group or a partially hydrolyzed product of said silane, and (F) (i) a silane with a functional amine group of formula (4):

$$(R^5O)_3Si-R^6-NH-R^7 \qquad (4)$$

wherein each $R^5$, independently, is an unsubstituted or a substituted monovalent hydrocarbon group; $R^6$ is an unsubstituted or a substituted divalent organic group; and $R^7$ is a hydrogen atom, an unsubstituted or a substituted monovalent hydrocarbon group, or an aminoalkyl group, or (ii) an addition product of a silane of formula (4) with an acrylic acid or methacrylic acid ester.

2. A composition of claim 1, wherein:
$R^1$, $R^2$, $R^4$, and $R^5$ have 1-10 carbon atoms, and are optionally substituted by halogen, and
$R^3$ has 1-8 carbon atoms, and is optionally substituted by halogen.

3. In a cured product obtained by the curing of a room temperature curable organopolysiloxane composition, the improvement wherein the curable organopolysiloxane composition is one of claim 1.

4. In a cured product obtained by the curing of a room temperature curable organopolysiloxane composition, the improvement wherein the curable organopolysiloxane is one of claim 2.

5. A two-component room temperature curable organopolysiloxane composition of claim 1, comprising a base polymer comprising components (A) and (D), and a curing agent comprising components (B), (C), (E) and (F).

6. A composition of claim 1 wherein component (F) is an addition product of a silane of formula (4) with an acrylic acid or methacrylic acid ester.

7. A composition according to claim 1, wherein the amount of (B) is a molar ratio of 0.25-10, based on the number of hydroxyl groups in (A), the amount of (C) is 0.01-10 parts by weight, relative to 100 parts by weight of (A), the amount of (D) is 1-400 parts by weight per 100 parts by weight of (A), the amount of (E) is a molar ratio of 0.33-10, based on the number of hydroxyl groups in (A), and the amount of (F) is 0.1-5 parts by weight, per 100 parts by weight of (A).

8. A composition according to claim 2, wherein each of $R^1$, $R^2$, $R^4$ and $R^5$ independently is alkyl, cycloalkyl, alkenyl, aryl or aralkyl.

9. A composition according to claim 8, wherein each of $R^1$, $R^2$, $R^4$, and $R^5$ is independently methyl, ethyl, propyl, butyl, hexyl, cyclohexyl, vinyl, allyl, phenyl, tolyl, benzyl or phenylethyl, each optionally substituted by halogen.

10. A composition according to claim 2, wherein $R^3$ is alkyl, alkenyl, or aryl.

11. A composition according to claim 8, wherein $R^3$ is methyl, ethyl, propyl, butyl, vinyl, allyl, phenyl, or tolyl, each optionally substituted by halogen.

12. A composition according to claim 1, wherein $R^6$ has 1-10 carbon atoms and is alkylene, arylene or alkylene arylene.

13. A composition according to claim 12, wherein $R^6$ is methylene, ethylene, propylene, tetramethylene, hexamethylene, methylethylene, phenylene, tolylene, methylene phenylene or ethylene phenylene.

14. A composition according to claim 1, wherein $R^7$ has 1-10 carbon atoms and is alkyl or aminoalkyl.

15. A composition according to claim 14, wherein $R^7$ is methyl, ethyl, propyl, butyl, aminoethyl or N-aminoethyl.

16. A composition according to claim 1, wherein (F) is an addition production with an acrylic acid or methacrylic acid ester and has the formula $$(R^5O)_3Si-R^6-\underset{\underset{}{|}}{N}-(C_2H_4NH)_m-CH_2-\underset{\underset{}{|}}{\overset{R^8}{|}}\overset{R^9}{\underset{\overset{\|}{O}}{C}}-C-OR^{10},$$

wherein $R^8$ is hydrogen or $C_{1-10}$-alkyl, $R^9$ is hydrogen or methyl, and $R^{10}$ is a monovalent hydrocarbon group in which one or more hydrogen groups are optionally partially substituted by $-Si(OR^5)_3$, and m is 0, 1 or 2.

17. A composition according to claim 16, wherein $R^{10}$ is alkyl, cycloalkyl, alkenyl, aryl or aralkyl.

18. A composition according to claim 17, wherein $R^{10}$ is methyl, ethyl, propyl, butyl, hexyl, cyclohexyl, vinyl, allyl, phenyl, tolyl, benzyl or phenylethyl, each optionally substituted by halogen.

19. A composition according to claim 1, wherein (F) is $(CH_3O)_3-Si-C_3H_6-NH_2$, $(C_2H_5O)_3-Si-C_3H_6-NH_2$, $(CH_3O)_3-Si-C_3H_6-NH-C_2H_4NH_2$, $(C_2H_5O)_3-Si-C_3H_6-NH-C_2H_4NH_2$,

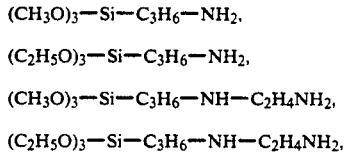CH_2—NH_2, or

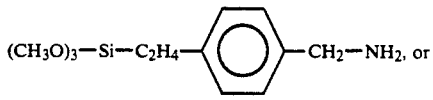

20. A composition according to claim 17, wherein (F) is $(CH_3O)_3-Si-C_3H_6-NH-C_2H_4-NH-C_2H_4COOCH_3$, $(CH_3O)_3-Si-C_3H_6-NH-C_2H_4COOC_3H_6Si(OCH_3)_3$, $(CH_3O)_3-Si-C_3H_6-NH-C_2H_4-NH-C_2H_4COOC_3H_6Si(OCH_3)_3$, $(C_2H_5O)_3-Si-C_3H_6-NH-C_2H_4COOC_2H_5$, $(C_2H_5O)_3-Si-C_3H_6-NH-CH_2\underset{\underset{CH_3}{|}}{CH}-COOC_3H_6Si(OCH_3)_3$, or

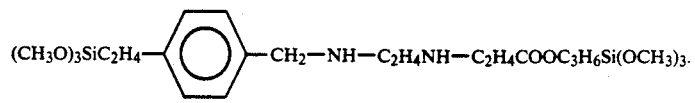
* * * * *